United States Patent
Prieto et al.

(10) Patent No.: US 8,751,145 B2
(45) Date of Patent: Jun. 10, 2014

(54) METHOD FOR VOICE RECOGNITION

(75) Inventors: Ramon Eduardo Prieto, Mountain View, CA (US); Carsten Bergmann, San Jose, CA (US); William B. Lathrop, San Jose, CA (US); M. Kashif Imam, Palo Alto, CA (US); Gerd Gruchalski, Ingolstadt (DE); Markus Möhrle, Ingolstadt (DE)

(73) Assignees: Volkswagen of America, Inc., Auburn Hills, MI (US); Audi AG, Ingolstadt (DE)

( * ) Notice: Subject to any disclaimer, the term of this patent is extended or adjusted under 35 U.S.C. 154(b) by 1552 days.

(21) Appl. No.: 11/290,365

(22) Filed: Nov. 30, 2005

(65) Prior Publication Data

US 2007/0124057 A1    May 31, 2007

(51) Int. Cl.
*G01C 21/00* (2006.01)
(52) U.S. Cl.
USPC ........... 701/408; 701/410; 701/445; 701/447; 701/467; 704/246; 704/270; 704/275; 704/252; 340/995.19; 340/995.23; 340/988; 340/907; 340/995.13
(58) Field of Classification Search
USPC ................ 701/408, 410, 409, 412, 428, 462; 340/995.19, 988, 907, 995.13; 704/246, 270, 275
See application file for complete search history.

(56) References Cited

U.S. PATENT DOCUMENTS

| | | | | |
|---|---|---|---|---|
| 6,115,669 | A * | 9/2000 | Watanabe et al. | 701/209 |
| 7,184,957 | B2 * | 2/2007 | Brookes et al. | 704/246 |
| 2003/0065516 | A1 * | 4/2003 | Hitotsumatsu | 704/275 |
| 2004/0008225 | A1 * | 1/2004 | Campbell | 345/764 |
| 2004/0059575 | A1 | 3/2004 | Brookes et al. | |
| 2004/0076279 | A1 * | 4/2004 | Taschereau | 379/218.01 |
| 2006/0106610 | A1 * | 5/2006 | Napper | 704/270 |
| 2007/0124057 | A1 * | 5/2007 | Prieto et al. | 701/200 |

FOREIGN PATENT DOCUMENTS

| | | |
|---|---|---|
| EP | 1 162 602 A1 | 12/2001 |
| EP | 0 768 638 B1 | 12/2002 |

OTHER PUBLICATIONS

Search Report issued by the European Patent Office for European Patent Application No. EP 06 02 4276, dated Oct. 5, 2010.

* cited by examiner

*Primary Examiner* — Redhwan K Mawari
(74) *Attorney, Agent, or Firm* — Manfred Beck, P.A.

(57) ABSTRACT

A voice recognition method that is used for finding a street uses a database including information about a plurality of streets. The streets are characterized by respective street names and street types. A user provides a voice input for the street that the user tries to find. The voice input includes a street name and a street type. The street type is recognized by processing the voice input. Streets having the recognized street type are then selected from the database and a street name of at least one of the streets selected from the database is recognized by processing the voice input.

8 Claims, 3 Drawing Sheets

METHOD FOR VOICE RECOGNITION

BACKGROUND OF THE INVENTION

Field of the Invention

The present invention relates to a voice recognition method for recognizing a street by processing a voice input provided by a user.

European Patent No. EP 0 768 638 B1 discloses a conventional voice recognition system for a navigation system mounted in a car. The navigation system includes a data storage for storing road map data, a detection device for detecting a current position of the car, and a display for displaying a map of the vicinity of the detected current position. The voice recognition system is configured to recognize geographical names such as the names of districts, cities, towns, and villages. If the voice recognition system is configured to recognize a large number of geographical names, then the computational outlay increases accordingly. In other words, in order to make sure that the voice recognition system can recognize a geographical name within a reasonably short time, the number of recognizable geographical names must be limited.

For example, the voice recognition system disclosed in European Patent No. EP 0 768 638 B1 limits the number of geographical names to about 3,500. Also, as the number of geographical names that the voice recognition system has to recognize increases, the possibilities of incorrectly recognizing a geographical name that is similar to the spoken geographical name increases. In other words, the accuracy of the recognition results decreases as the number of recognizable geographical names increases.

If a voice recognition system is required to recognize individual streets rather than recognizing just districts, cities, towns, and villages, then the number of recognizable geographical names may increase to well over a million geographical names. Conventional vehicle navigation systems with a voice recognition system that recognizes destination inputs through voice achieve the above-described requirements of a reasonably short recognition time and a reasonably high recognition accuracy by requiring the user to speak the name of the city alone. The voice recognition system then processes the voice input for the city. After the voice recognition system recognizes the city, the voice recognition system requires the user to speak the name of the street. In this case the voice recognition system recognizes the spoken street among all the streets that exist in the city that has been recognized. The number of streets in a city is generally not higher than a few thousand. As a consequence, it is possible for the voice recognition system to provide a recognition result for a spoken street within a sufficiently short time and with a sufficient accuracy.

A disadvantage of above described voice recognition system is that the dialog interaction between the voice recognition system and the user may be unreasonably distracting because the user has to first speak the name of the city, then the user has to wait for the voice recognition system to recognize the city and, finally, the user has to speak the name of the street. This dialog interaction requires the user to pay attention to the voice recognition system because the user has to speak the name of the street after the voice recognition system recognizes the spoken city. While driving a vehicle, the user may for example be prompted to speak the name of the street exactly when the user's full attention is required to manage an unforeseen driving situation. In such a driving situation, the user may perceive the dialog interaction with the voice recognition system as troublesome and annoying.

Voice recognition systems that require the user to provide separate voice inputs for the city and the street according to the above-described dialog interaction increase a user's workload when trying to find a street. The workload for the user may be reduced if the voice recognition system limits the streets capable of being recognized to the streets in the close vicinity of a current location of the user or vehicle. In this case, the voice recognition system does not require a voice input for the city because the recognizable streets are selected based on the location of the vehicle. The number of streets that can be recognized is usually limited to less than 5,000 streets. A disadvantage of limiting the recognizable streets to streets close to the user's current location is that the user may only be able to request a given street in a city close to the user's current location but the user will not be able to request a street in a city further away from the user's current location.

SUMMARY OF THE INVENTION

It is accordingly an object of the invention to provide a method for voice recognition, which overcomes the above-mentioned disadvantages of the heretofore-known methods of this general type and which simplifies the dialog interaction for the voice input and which does not distract the user while driving.

Specifically, the method for voice recognition should not be restricted to recognizing only a voice input for large communities such as cities or recognizing only a voice input for streets close to a current location.

With the foregoing and other objects in view there is provided, in accordance with the invention, a method for voice recognition, which includes the steps of:

providing a database including information for a plurality of streets, the streets (e.g. Miranda Avenue) being characterized by respective street names (e.g. Miranda) and street types (e.g. Avenue);

providing a voice input including a street name information and a street type information;

recognizing a given street type by processing the voice input;

selecting streets having the given street type from the database; and recognizing a street name of at least one of the streets selected from the database by processing the voice input.

Another mode of the method of the invention includes calculating a current location of a vehicle; selecting streets within a given distance from the vehicle; and recognizing a street type and a street name of only the streets within the given distance from the vehicle.

A further mode of the method of the invention includes performing a phoneme recognition on the voice input and selecting at least one phoneme recognized with a given confidence level; and recognizing the street name by matching the at least one phoneme recognized with the given confidence level to phonemes characterizing the streets stored in the database.

Yet another mode of the method of the invention includes performing a phoneme recognition on the voice input and selecting at least one phoneme recognized with a given confidence level; recognizing a number of street names by matching the at least one phoneme recognized with the given confidence level to phonemes characterizing the streets stored in the database; and outputting the recognized streets such that a user can select one of the recognized streets.

Another mode of the method of the invention includes recognizing the street type prior to recognizing the street name.

A further mode of the method of the invention includes storing the voice input as a data file and recognizing the street type and the street name by processing the data file.

Yet a further mode of the method of the invention includes recognizing the street type and the street name without requiring a voice input for information about a city.

Another mode of the method of the invention includes performing a phoneme recognition on each segment of a speech waveform, the speech waveform representing the voice input; and selecting streets having at least one phoneme recognized with a given confidence level.

With the objects of the invention in view there is also provided, a method for finding information in a database, which includes the steps of:

storing street information in a database, the street information including a street name and a street type for each of a plurality of streets;
eliminating streets from the database that are remote from a given location;
recognizing a given street type by processing a voice input;
eliminating streets from the database that have a street type different from the given street type; and
subsequently recognizing a street name by matching at least one phoneme recognized in the voice input to at least one phoneme characterizing respective streets that have not been eliminated from the database.

Other features which are considered as characteristic for the invention are set forth in the appended claims.

Although the invention is illustrated and described herein as embodied in a method for voice recognition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
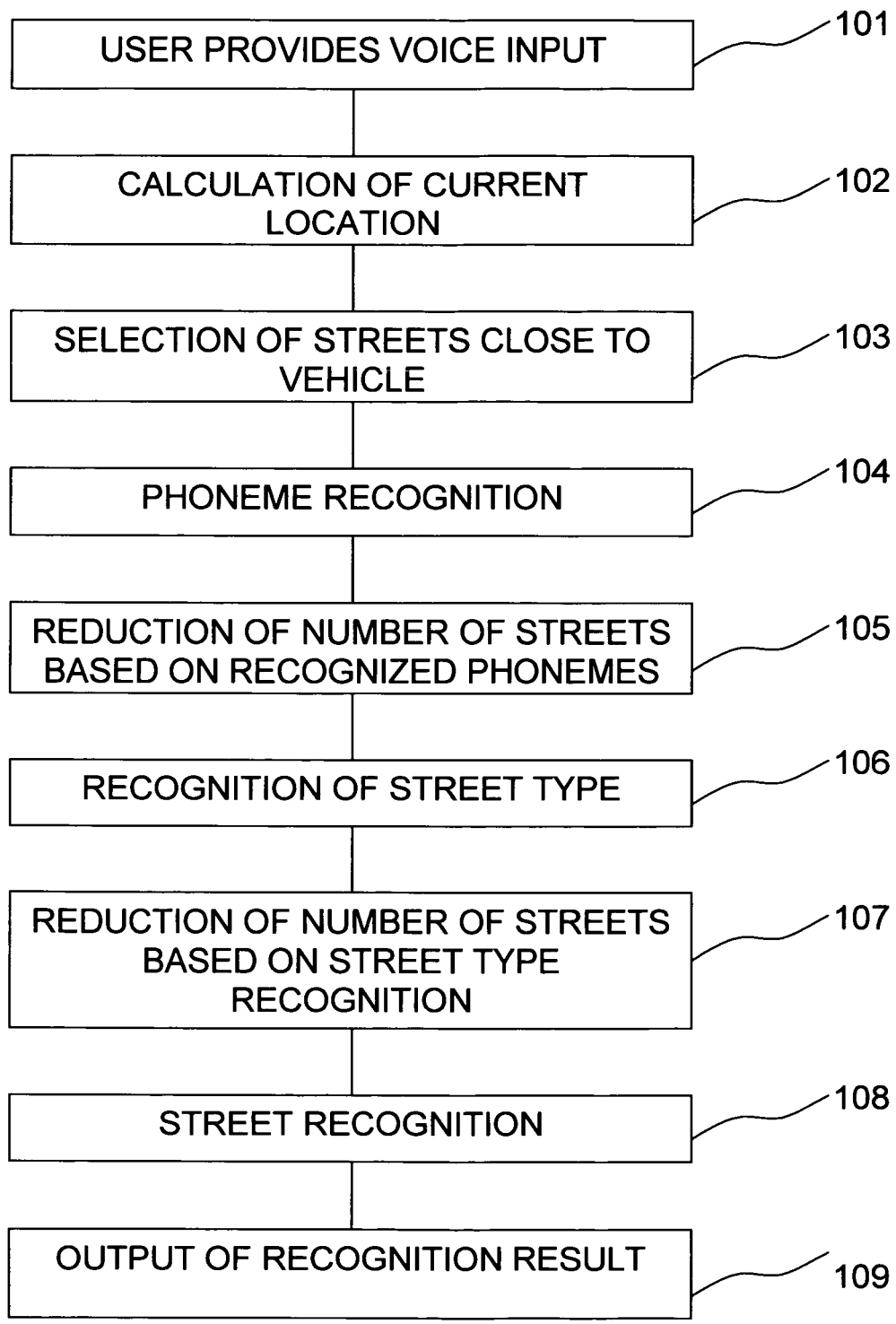
FIG. 1 is a flow chart illustrating steps of the method of voice recognition according to the invention.

Referring now to the figures of the drawings in detail and first, particularly, to FIG. 1 thereof, there is shown a flow chart illustrating method steps that are performed if a user wants to find a specific street. In the example illustrated, it is assumed that a user is in a vehicle that is equipped with an in-car navigation system that has a voice recognition system according to the invention. If the user wants to go the "Del Medio Avenue," the user will speak "Del Medio Avenue" in order to provide a voice input for a speech recognition as is indicated in step 101.

The in-car navigation system calculates a current position of the vehicle as indicated by step 102. Based on the current position of the vehicle, the voice recognition system will select a number of the streets that are closest to the vehicle as indicated by step 103 in FIG. 2. Depending on a given accuracy threshold, the number of the closest streets is for example 50,000 or 100,000. Streets that do not fall into the category of the closest streets are considered remote from the vehicle. This selection of the closest streets is preferably performed as a dynamic location-based street database sampling.

In step 104 the voice recognition system performs a phoneme recognition on the sentence spoken by the user. As an outcome, the voice recognition system returns the phonemes recognized with the highest confidence. The highest confident phonemes may for example be: "d" followed by "m" followed by "d" followed by "n."

The voice recognition system then discards all the streets that do not have the phonemes "d, m, d, n" in that order. Step 105 indicates this reduction of streets based on the phoneme recognition result. As a result, there may be less than 10,000 streets remaining, for example, 8,000 streets may remain after performing both the location-based reduction of the number of streets and the phoneme-based reduction of the number of streets.

In a subsequent step 106, the voice recognition system performs a street type recognition on the spoken sentence. In the street type recognition stage, the voice recognition system is not concerned with the name of the street. In the example of "Del Medio Avenue," step 106 will not deal with the recognition of the street name "Del Medio" but will only try to recognize the street type "Avenue." In step 106, the voice recognition will only discriminate between street types, i.e. the voice recognition system only tries to discriminate between words that indicate a street type such as "avenue," "road," "street," "court," "circle" and so forth. The step of recognizing the street type involves recognizing a street type from only about 200 different street types. This allows recognizing the street type quickly and accurately. If the user spoke "Del Medio Avenue," then a successful street type recognition will recognize the word "Avenue."

In a further step 107, the voice recognition system discards all the streets that do not include the word "Avenue." If, as in the example given above, the number of streets remaining after the location-based reduction and the phoneme-based reduction of the number of streets is 8,000, then the number of streets remaining after the street type recognition may be only about 1,000.

In step 108 the voice recognition system then performs a street recognition among the streets that remain after eliminating streets that have a street type different from the recognized street type. The street recognition of step 108 is then for example performed among 1,000 streets. In step 109, the voice recognition system provides the recognition result to the user either by a voice output telling the user the correctly recognized street "Del Medio Avenue" or it will display the best matches on a screen so that the user can select one of the displayed streets.

Figure 2:
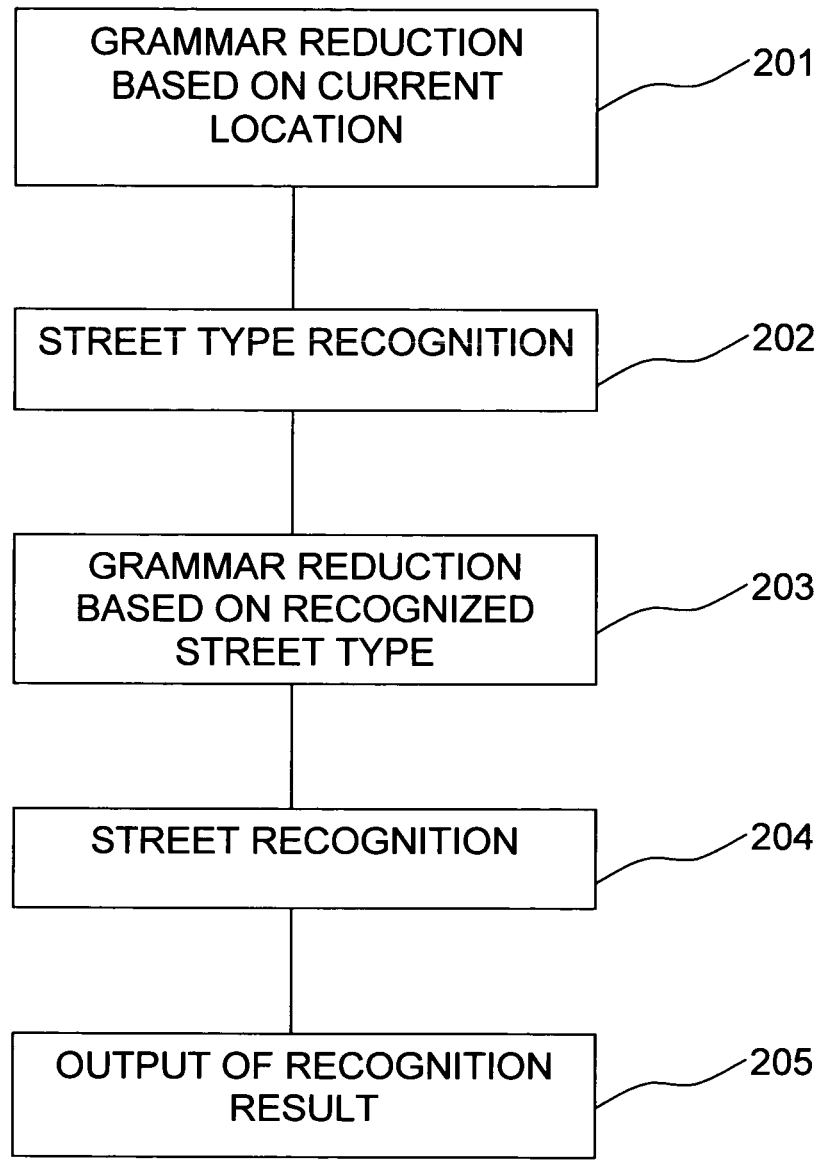
FIG. 2 is a flow chart providing an overview of main steps of the method of voice recognition according to the invention.

The main features of the method of voice recognition are further explained with reference to FIG. 2. In a first main step 201, a location-based grammar reduction is performed by eliminating streets remote from a current location and selecting streets close to the current location. Step 201 performs only a very mild reduction of the streets that are available for voice recognition based on the current location of the vehicle. Step 201 keeps for example around 50,000 to 100,000 streets in the grammar rather than reducing the number of streets to only around 1,000 to 5,000 as is the case for conventional location-based grammar reductions of voice recognition methods.

In a subsequent step 202, the voice recognition system performs a street type recognition. In this step, the voice recognition system recognizes the words that represent a street type such as "road," "way," and "avenue." There are only around 200 different street types and thus the recognition of the street type can be performed within a short period of time and with a sufficiently high accuracy. In order to recognize the street type, the voice recognition processes a stored speech waveform of the voice input of the user.

After recognizing what type of street was pronounced, the voice recognition system performs step 203 for further reducing the grammar to only those streets that contain the recognized street type, i.e. streets that have a street type different from the recognized street type are eliminated from a further voice recognition.

The voice recognition system performs a phoneme recognition on each segment of the stored speech waveform and reduces the grammar to the streets that contain the most confident phonemes in their phonetic transcription.

In step 204, the voice recognition system performs a street recognition only on the streets that match the recognized street type and only on the streets that match the highest confident phonemes.

Depending on statistical thresholds, either the top match is returned to the user by voice for verbal confirmation, or a number of the best matches are displayed on a screen. Step 205 indicates the output of the voice recognition result to the user. The user can then select one of the top matches either by voice, touching a screen or some other method of selection.

The features that are specific to the voice recognition system are that it performs a phoneme recognition on each segment of the speech waveform. The voice recognition system reduces the grammar to the streets that contain the most confident phonemes in their phonetic transcription. The voice recognition system performs a street type recognition, i.e. it recognizes the words "road," "way," "avenue" etc. on the same speech waveform on which it recognizes the street name, e.g. "Del Medio." After recognizing the street type of the street that the user pronounced, the voice recognition system further reduces the grammar to only those streets that contain the recognized street type.

Figure 3:
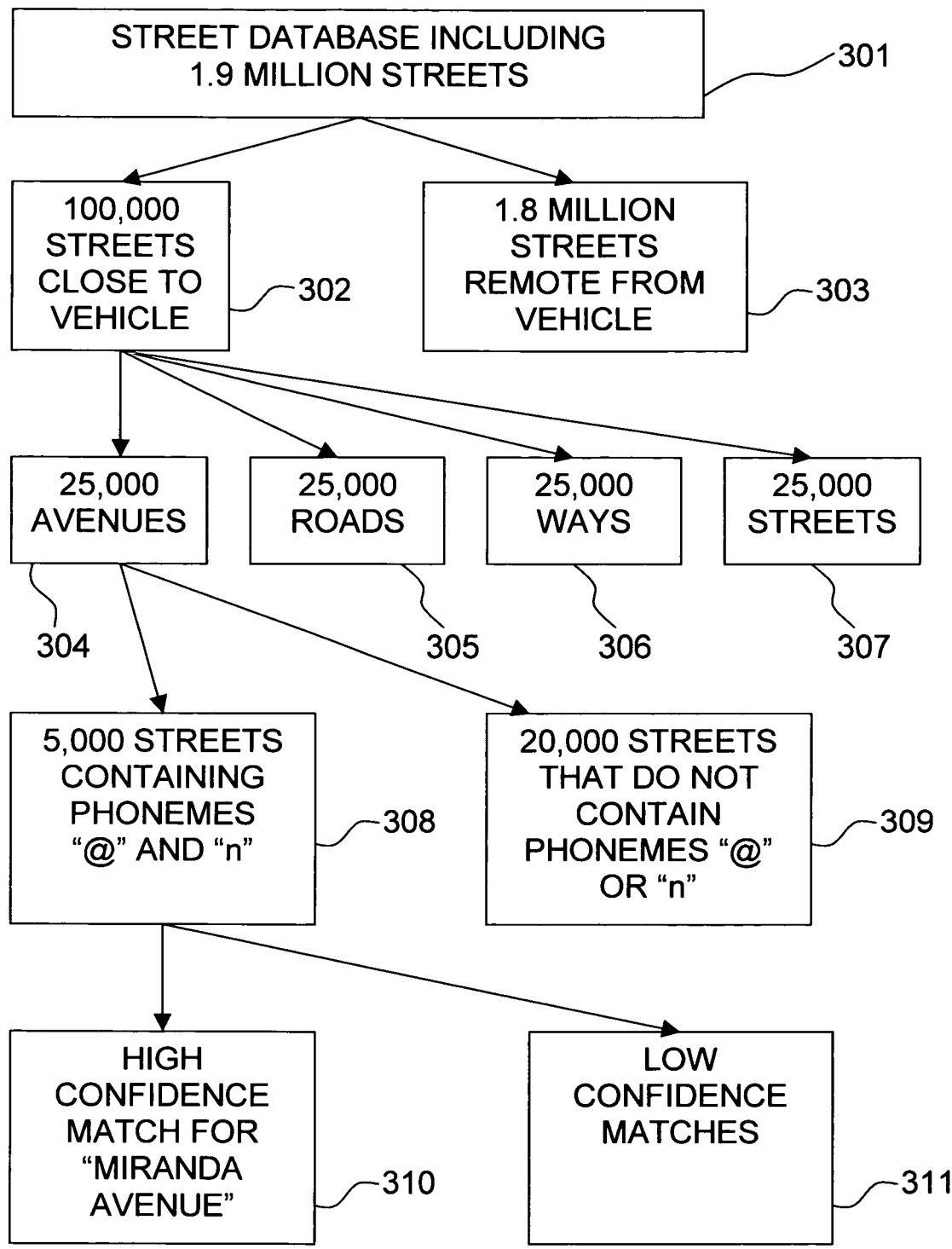
FIG. 3 is a schematic chart illustrating a database reduction according to the invention.

FIG. 3 is a schematic overview illustrating a database reduction according to the invention. The voice recognition system has a large database 301 that includes all the streets that a user may try to find by providing a voice input to the voice recognition system. In the present example the street database includes 1.9 million streets. The total number of streets in the database 301 depends of course on the geographical area that is covered. In order to reduce the number of streets that are available for voice recognition, the voice recognition system performs a location-based reduction of the streets by selecting the streets that are close to the vehicle's location. Box 302 indicates the streets close to the vehicle's location and box 303 indicates the streets remote from the vehicle's location. Here, the voice recognition system selects for example 100,000 streets that are close to the vehicle's location which leaves 1.8 million streets that are classified as being far away from the vehicle's position.

The street database 302 which includes the streets close to the vehicle's location is reduced by a recognition of the street type. By way of example, FIG. 3 illustrates the street type "avenue" in box 304 which includes for example 25,000 avenues, the street type "road" in box 305 including 25,000 roads, the street type "way" in box 306 including 25,000 ways and the street type "street" in box 307 including 25,000 streets. There are only about 200 different street types. If, for example, the user wants to find "Miranda Avenue" then the street database is reduced to the streets having the street type "avenue" as indicated by box 304.

The next reduction of the street database is based on a phoneme recognition. The English language has only about 50 different phonemes. The phonetic transcription of "Miranda" can be written as "m@ r{n d@." The voice recognition selects the highest confidence phonemes as indicated by box 308 and eliminates the low confidence phonemes indicated by box 309. In the present example, the reduction results in 5,000 streets that contain the phonemes "@" and "n" indicating that "Miranda" is included in those 5,000 streets. The remaining 20,000 streets that do not contain the phonemes "@" or "n" are eliminated.

Finally, the voice recognition system performs a street recognition in order to get the final result. The street recognition eliminates low confidence matches indicated by box 311 and presents the best match or a number of top matches as indicated by box 310 to the user either as a voice output or on a display so that the user can confirm the recognition result or select one of the top matches.

An advantage of a voice recognition method that uses the above-described street-first destination input is that the user has to speak only once. For example, the user only says "Mirande Avenue." The voice recognition system saves the user's voice input for "Miranda Avenue" as a wave file and processes the voice input without requiring a further dialog interaction. This is in contrast to conventional systems that first require a voice input for a city and, after processing the voice input for the city, require an additional voice input for the street. A further advantage of the speech recognition method according to the invention is that the streets that can be requested are not restricted to a specific city or to adjacent cities of a current location. Instead, the number of streets that can be recognized in the vicinity of a current location may include for example 50,000 to 100,000 streets.

We claim:

1. A method for voice recognition, comprising:
providing a database including information for a plurality of streets, the streets being characterized by respective street names and street types;
performing a location-based grammar reduction by eliminating streets remote from a current location of a vehicle;
providing a voice input including a street name information and a street type information;
recognizing, with a voice recognition system, a given street type selected from a given number of different street types by processing the voice input, wherein the step of recognizing a given street type is performed prior to the step of recognizing a street name;
selecting, with the voice recognition system, streets from the database that have the given street type and that have not been eliminated by the location-based grammar reduction as streets remote from the current location of the vehicle, wherein the step of selecting streets having the given street type is performed prior to the step of recognizing a street name; and
subsequently recognizing, with the voice recognition system, a street name of at least one of the streets selected from the database as having the given street type by processing the voice input.

2. The method according to claim 1, which comprises:
calculating a current location of a vehicle;

selecting streets within a given distance from the vehicle; and recognizing a street type and a street name of only the streets within the given distance from the vehicle.

3. The method according to claim 1, which comprises:

performing a phoneme recognition on the voice input and selecting at least one phoneme recognized with a given confidence level; and recognizing the street name by matching the at least one phoneme recognized with the given confidence level to phonemes characterizing the streets stored in the database.

4. The method according to claim 1, which comprises:

performing a phoneme recognition on the voice input and selecting at least one phoneme recognized with a given confidence level;

recognizing a number of street names by matching the at least one phoneme recognized with the given confidence level to phonemes characterizing the streets stored in the database; and outputting the recognized streets.

5. The method according to claim 1, which comprises storing the voice input as a data file and recognizing the street type and the street name by processing the data file.

6. The method according to claim 1, which comprises recognizing the street type and the street name without requiring a voice input for information about a city.

7. The method according to claim 1, which comprises:

performing a phoneme recognition on each segment of a speech waveform, the speech waveform representing the voice input; and selecting streets having at least one phoneme recognized with a given confidence level.

8. A method for finding information in a database, comprising:

storing street information in a database, the street information including a street name and a street type for each of a plurality of streets;

eliminating streets from the database that are remote from a given location;

recognizing, with a voice recognition system, a given street type selected from a given number of different street types by processing a voice input, wherein the step of recognizing a given street type is performed prior to the step of recognizing a street name;

eliminating streets from the database that have a street type different from the given street type; and subsequently recognizing, with the voice recognition system, a street name by matching at least one phoneme recognized in the voice input to at least one phoneme characterizing respective streets that have not been eliminated from the database.

* * * * *